United States Patent [19]
DeLuca et al.

[11] Patent Number: 5,144,296
[45] Date of Patent: Sep. 1, 1992

[54] ADAPTIVE BATTERY SAVING CONTROLLER WITH SIGNAL QUALITY DETECTING MEANS

[75] Inventors: Michael J. DeLuca; Tuan K. Nguyen, both of Boca Raton, Fla.

[73] Assignee: Motorola, Inc., Schaumburg, Ill.

[21] Appl. No.: 578,997

[22] Filed: Sep. 7, 1990

[51] Int. Cl.⁵ .............................................. H04B 7/00
[52] U.S. Cl. ................................ 340/825.44; 455/343
[58] Field of Search .................... 340/825.44, 825.47, 340/825.48, 311.1; 455/31, 32, 38, 227, 343

[56] References Cited
U.S. PATENT DOCUMENTS

| | | | |
|---|---|---|---|
| 4,419,765 | 12/1983 | Wycoff et al. | 455/227 |
| 4,652,875 | 3/1987 | Waki | 340/825.44 |
| 4,776,034 | 10/1988 | Matsuo | 340/825.48 |
| 4,851,820 | 7/1989 | Fernandez | 340/825.44 |
| 5,027,428 | 6/1991 | Ishiguro et al. | 455/343 |

FOREIGN PATENT DOCUMENTS 0103523 5/1988 Japan ................................ 455/343

Primary Examiner—Donald J. Yusko
Assistant Examiner—Dervis Magistre
Attorney, Agent, or Firm—Philip P. Macnak; Vincent B. Ingrassia; William E. Koch

[57] ABSTRACT

An adaptive battery saving controller for a battery powered communication receiver utilizes a signal quality detector for detecting strong signal and weak signal conditions. During strong signal conditions, the adaptive battery saving controller is capable of suspending the supply of power to the receiver during the reception of message code words not intended for the communication receiver. The adaptive battery saving controller is also capable of suspending the supply of power to the receiver following the detection of a hard address error. During weak signal conditions, the adaptive battery saving controller reverts to conventional battery saving techniques.

20 Claims, 8 Drawing Sheets

ADAPTIVE BATTERY SAVING CONTROLLER WITH SIGNAL QUALITY DETECTING MEANS

BACKGROUND OF THE INVENTION

The present invention relates generally to the field of battery saving controllers for portable communication receivers, and more particularly to an adaptive battery saving controller suitable for use with portable communication receivers utilizing synchronous signaling protocols.

Battery saving circuits for controlling battery power consumption have been utilized in battery powered communication receivers, such as battery powered paging receivers, for many years. The battery saving controllers were provided to conserve battery power and to extend the useable life of the batteries. The specific operation of such battery saving controllers was largely determined by the type of signaling format used within the paging system in which the battery powered paging receiver was operated. The battery saving operation for a typical prior art battery saving controller is shown in FIG. 1, which represents the battery saving operation for one of the well known synchronous signaling formats, the POCSAG signaling format. As shown in FIG. 1, the POCSAG signaling format provides a thirty-two bit address code word 102 and a thirty-two bit message code word 104 for numeric and alphanumeric message transmission. In the POCSAG signaling format, the address code word is distinguished from the message code word by the value of the first data bit, B0. Address code words are identified by a logical zero bit value for the first data bit, whereas message code words are identified by a logical one bit value for the first data bit. Message transmissions 105 in the POCSAG signaling format begin with the transmission of a preamble code word 106 followed by one or more POCSAG batches 108. Each POCSAG batch 108, comprises a synchronization code word 110, followed by eight transmission frames 112, each frame providing for the transmission of two address code words, an address code word and a message code word, two message code words, or idle code word when address or message code words are not being transmitted. Individual pagers operating within the system are assigned to one of the eight transmission frames to effect the well known POCSAG battery saving operation. The battery saving operation of the prior art POCSAG battery saving controller is shown by the battery saving strobe waveform 114, which depicts supplying power to at least the receiver portion of the paging receiver during the transmission frame to which the paging receiver was assigned. In the example shown, the paging receiver was assigned to frame 5. When the paging receiver was initially turned on, or when the paging receiver was searching for a POCSAG signal, power was periodically provided to the receiver portion of the paging receiver for a predetermined time period sufficient for the paging receiver to detect the transmission of a preamble signal. When the preamble signal was not detected within the predetermined time period, the supply of power to the receiver portion was suspended, until the next predetermined time interval. As shown in FIG. 1, the preamble signal was detected by the paging receiver during the time period 116 during which power was supplied to the receiver portion. During this time period the receiver obtained bit synchronization with the preamble signal and thereafter obtained word synchronization with the synchronization code word 110. Power to the receiver portion was then suspended until the assigned frame time interval. Power was again supplied to the receiver portion at a time 122 prior to the assigned frame to enable the receiver operation to stabilize, thereafter allowing the transmitted address and message information to be received and processed during the assigned frame time interval 118. Power to the receiver portion was again suspended at the end of the assigned frame time interval 118, in the event no message was intended for the paging receiver, until the next transmission of the synchronization code word during the synchronization code word time interval 120. Thereafter, power was regularly supplied to the receiver during the assigned frame time interval and during the synchronization code word time interval. Such a battery saving operation as utilized by the prior art battery saving controllers, while providing a significant improvement in battery life, resulted in a significant amount of information which was received and processed, even when this information was not intended for the paging receiver. This was especially true in paging systems transmitting numeric and alphanumeric messages, as power was maintained to the receiver portion during the entire assigned frame time interval, even in those instances when the address and corresponding message information which was received was not intended for the paging receiver.

SUMMARY OF THE INVENTION

It is an object of the present invention to provide a battery saving controller which adapts to strong signal and weak signal conditions to provide improved battery saving operation.

It is a further object of the present invention to provide an adaptive battery saving controller which distinguishes address code words and message code words to provide improved battery saving operation.

It is a further object of the present invention to provide an adaptive battery saving controller which operates to improve address decoding to provide improved battery saving operation.

These and other objects of the invention are achieved by an adaptive battery saving controller for a battery powered communication receiver providing a signal quality detector for detecting strong signal and weak signal conditions. During strong signal conditions, the adaptive battery saving controller is capable of suspending the supply of power to the receiver during the reception of message code words not intended for the communication receiver. The supply of power to the receiver is also be suspended following a hard address error detection.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DESCRIPTION OF THE PREFERRED EMBODIMENTS

Figure 1:
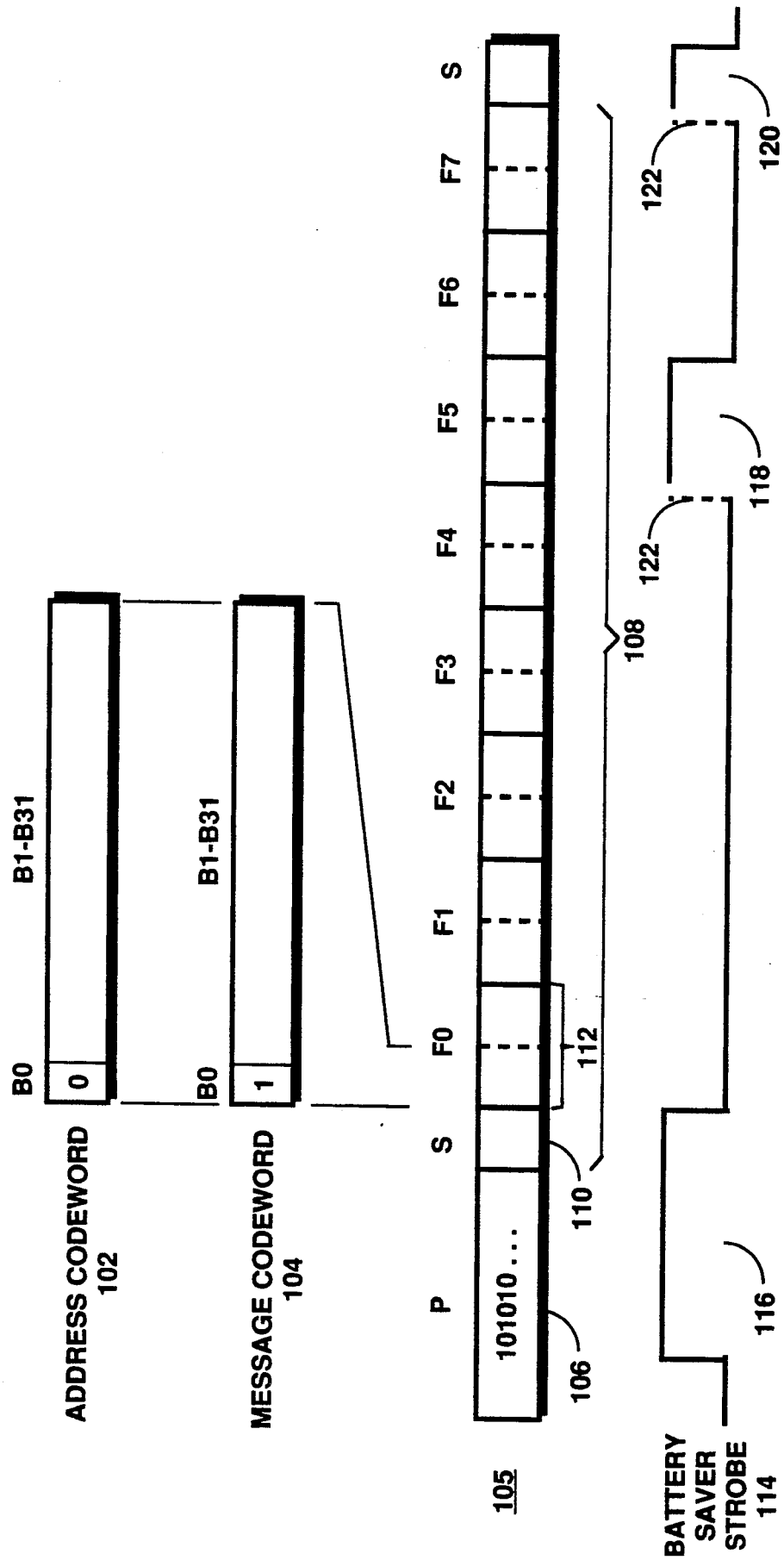
FIG. 1 is a timing diagram showing the POCSAG signaling protocol and the prior art battery saving controller operating waveform.
Figure 2:
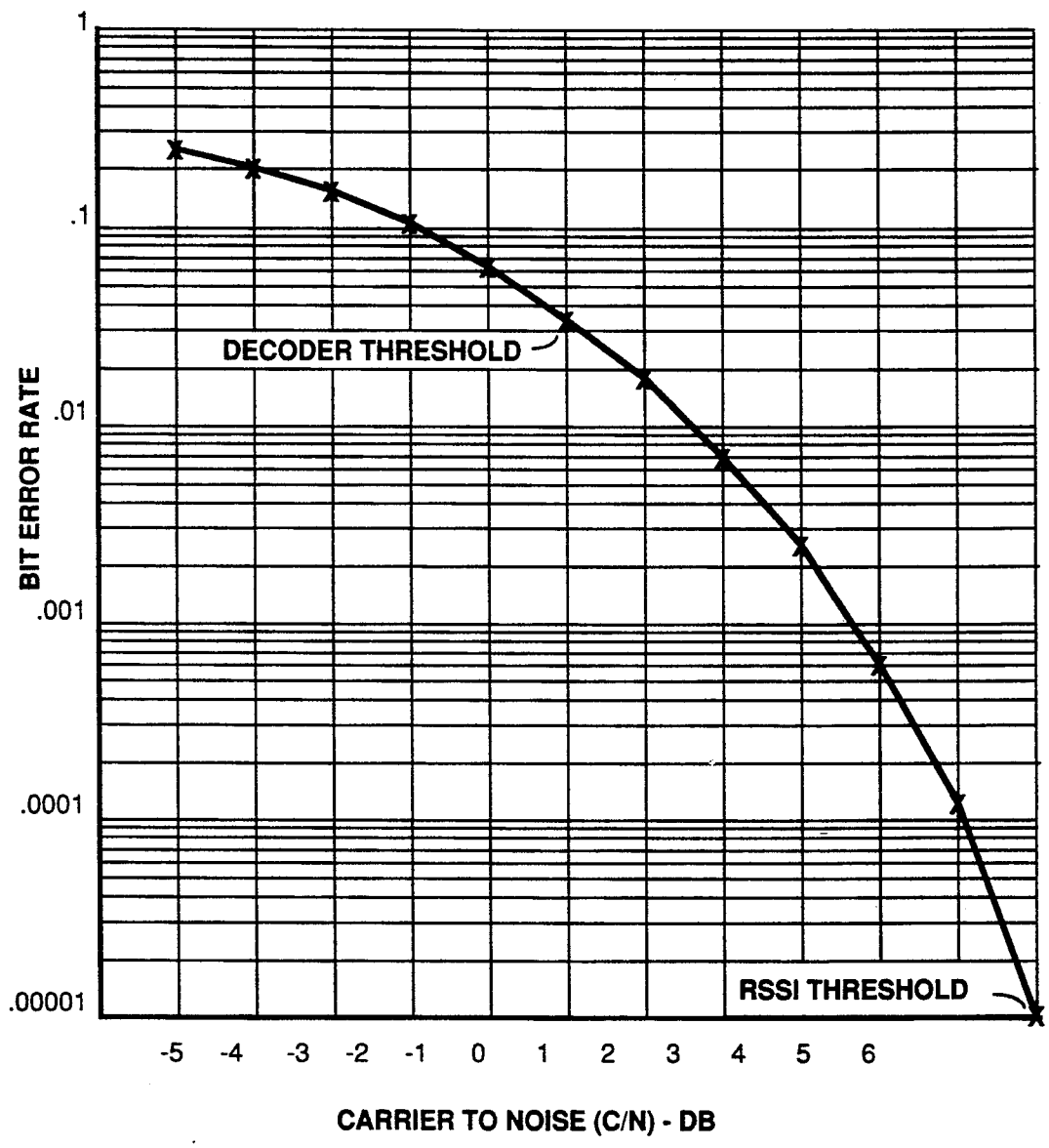
FIG. 2 is a graph showing a typical decoding bit error rate as a function of the received signal carrier to noise ratio for a conventional frequency modulated (FM) communication receiver.

With respect to the figures, FIGS. 2-8 illustrate in general the operation of the preferred embodiments of the adaptive battery saving controller of the present invention. FIG. 2, in particular, is a graph showing bit error rate for a typical POCSAG decoder which is plotted as a function of the received carrier to noise signal ratio for a conventional frequency modulated (FM) communication receiver, such as a paging receiver. The decoder bit error rate is defined as the probability of incorrectly detecting a received data bit, and as shown in FIG. 2, the decoder bit error rate degrades rapidly as the receiver carrier to noise ratio degrades below the decoder threshold level. The decoder threshold is defined as the minimum signal level required to achieve a predetermined probability of correct address reception, and typically represents a ninety per cent probability of reliable address detection. The decoder threshold, it will be appreciated, is determined by a number of factors, including but not limited to, the actual receiver performance, and the error correcting capability for the code utilized for the signaling format. The decoder threshold for a typical paging receiver utilizing POCSAG signaling occurs at approximately 0 dB (decibels) carrier to noise signal ratio. Paging systems are generally designed to provide additional margin in the transmitted signal strength within the coverage area provided by the system, to insure reliable message transmission to the paging receivers operating within the system. In such systems, the received carrier to noise signal ratio is generally in excess of plus 6 dB throughout the coverage area. Additional coverage is provided out to the system fringe limits, which is defined as that coverage area where the received signal is above the decoder threshold. As a result, address and message information received by the paging receiver is generally received with a very high probability of being free from errors. As shown by the graph of FIG. 2, for a 6 dB carrier to noise ratio, or better, the bit error rate is one in one million bits (0.00001) or better. In the preferred embodiment of the present invention, a signal strength indicator, as will be described in detail below, is used to monitor the received signal strength to provide a signal quality indication. Such a signal quality indication allows the adaptive battery saver controller of the present invention to reliably detect and distinguish between hard and soft decoding errors. When a hard decoding error is detected, the supply of power to the receiver is suspended, as will be described in detail below, otherwise address decoding is performed in a manner well known in the art. A hard decoding error is defined as a bit error which is detected when a received address bit does not match the corresponding address bit stored in the receiver code memory, the bit error being detected when the magnitude of the received signal is equal to, or above, a predetermined signal level, which corresponds to a predetermined carrier to noise ratio. Such a hard decoding error indicates the code word being received is not intended for the paging receiver, even though the entire code word has yet to be received. A soft decoding error is then defined as a bit error which is detected when the magnitude of the received signal is less than the predetermined signal level, and above the decoder threshold level. Such soft decoding errors are due to such factors as burst noise errors, signal fading errors and errors due to low signal strength such as encountered inside buildings at the fringe of coverage. Soft errors are correctable, within limits, by the error detecting and correcting capability of the POCSAG 32,16 BCH coding system utilized in the paging receiver. The adaptive battery saving controller of the present invention utilizes hard and soft decoding error detection on a bit by bit basis to achieve improved battery life, as will be described in detail below.

Figure 3A:
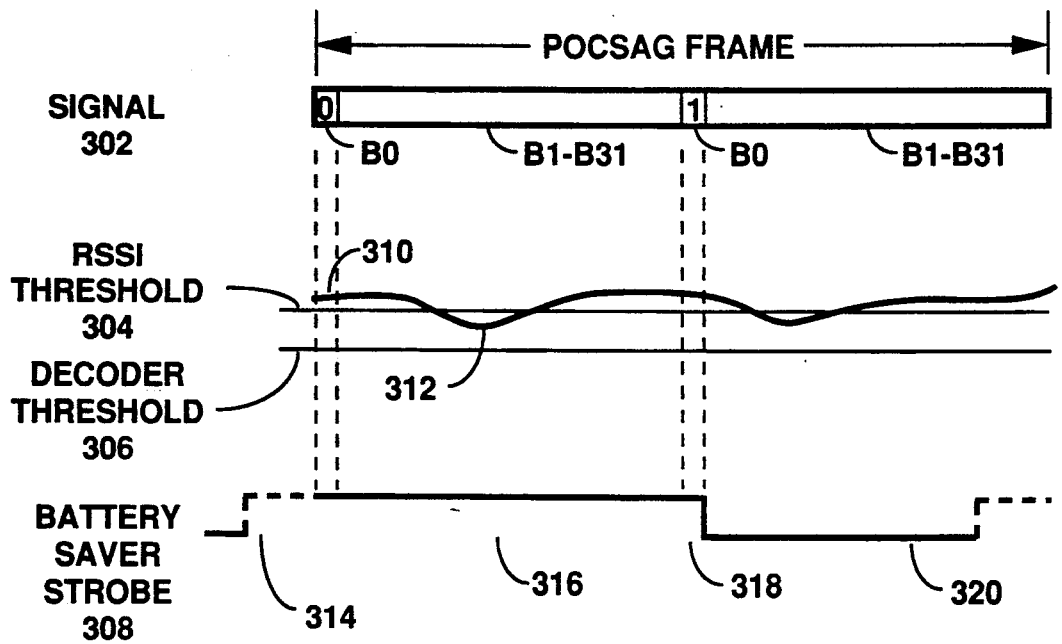
FIG. 3A is a timing diagram showing the battery saving controller operating waveforms for the preferred embodiment of the adaptive battery saving controller of the present invention.

FIG. 3A is a timing diagram showing the battery saving controller operating waveforms for a first preferred embodiment of the adaptive battery saving controller of the present invention. In the first embodiment of the present invention the adaptive battery saving controller distinguishes between received address and message code words when making the decision to battery save. As shown in FIG. 3A, the paging signal 302 transmitted during a POCSAG frame can comprise, as for example, a thirty-two bit word including a code word identifier bit identified by the first data bit B0 being transmitted as a zero (0) for the address, followed by a thirty-two bit message code word including a code word identifier bit identified by the first data bit B0 being transmitted as a one (1) for the message. The paging signal 302 may also be the transmission of two address code words, two message code words, or a message code word followed by an address code word. During the reception of bit B0, the magnitude 310 of the received signal strength is shown to be greater than the received signal strength indicator (RSSI) threshold 304, although as shown, the received signal strength magnitude 312 may degrade below the RSSI threshold during the reception of the signal, such as would occur in a fading environment. Prior to bit B0 being received, the battery saver strobe 308 supplies power to the receiver during time interval 314, allowing the receiver to warm up prior to the reception of the first bit of the first code word of the frame, during time interval 316. Because the received signal was above the RSSI threshold at the time of reception of bit B0, the adaptive battery saver controller is assured the code word being received is an address code word, and maintains the supply of power to the receiver for the duration of the address code word, after the reception of bit B0. The battery saver strobe 308 signal level indicates the supply of power to the receiver is maintained during at least a portion of time interval 318, allowing the receiver to receive the first bit of the second code word of the frame. Because the received signal was again above the RSSI threshold at the time of reception of bit B0, the adaptive battery saver controller is assured the code word being received in this instance is a message code word. In the example shown, the address received during the first code word did not correspond to an address assigned to the paging receiver, and as a result, the message code word being received during the second code word is not intended for the paging receiver, consequently the supply of power is suspended to the receiver during time interval 318 following the reception of bit B0.

When the address which is received during time interval 316 correspond to the address assigned to the paging receiver, the supply of power to the receiver is maintained during the time interval 318, irregardless of the received signal magnitude, to allow the reception of the message code word. Power is then suspended to the receiver upon completing the message reception, until the next time interval provided for the reception of the synchronization code word, at which time power is again supplied to the receiver.

Figure 3B:
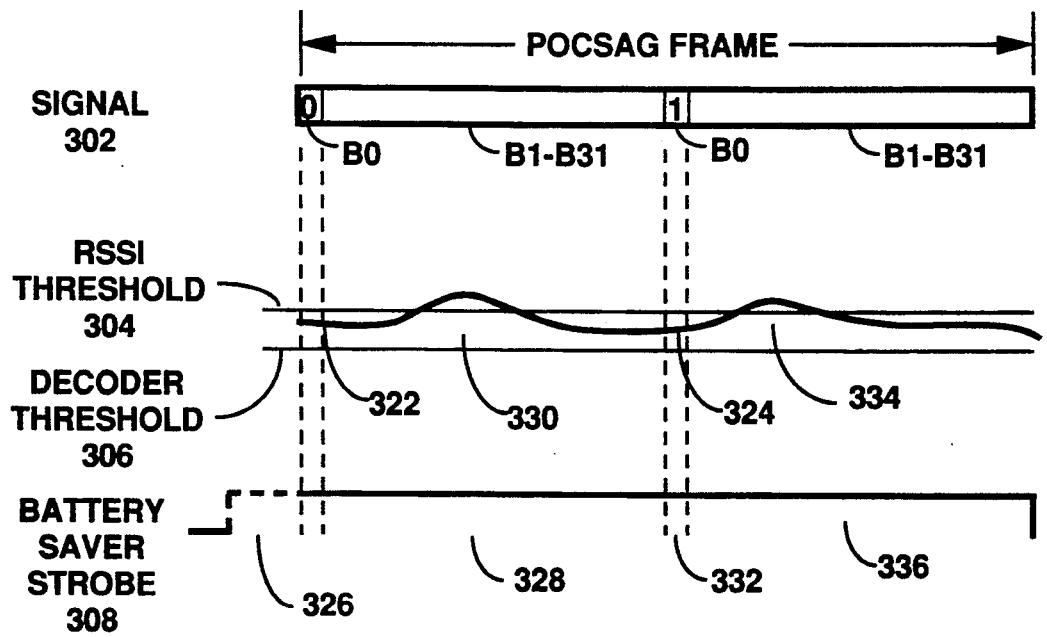
FIG. 3B is a further timing diagram showing the battery saving controller operating waveforms for the preferred embodiment of the adaptive battery saving controller of the present invention.

FIG. 3B is a timing diagram showing the battery saving controller operating waveforms showing the adaptability of the adaptive battery saving controller of the present invention. During the reception of bit B0, the magnitude 322 of the received signal is shown to be less than the received signal strength indicator (RSSI) threshold 304, although as shown, the received signal magnitude 312 may be greater than the RSSI threshold during the reception of any portion of the signal, shown as during time 330. Prior to bit B0 being received, the battery saver strobe 308 supplies power to the receiver during time interval 326, as previously described. Because the received signal is below the RSSI threshold at the time of the reception of bit B0, the adaptive battery saver controller cannot positively identify the code word being received as an address code word, and therefore the supply of power to the receiver is maintained for the duration of the received code word, during time interval 328. In this instance an alternate form of battery saving during the reception of the code word is described in U.S. Pat. No. 4,996,526 issued Feb. 19, 1991 to DeLuca entitled "Power Conservation Method and Apparatus for a portion of a Synchronous Information Signal" which is assigned to the assignee of the present invention and which is hereby incorporated by reference herein. Should the decoder determine the received code word is an address code word assigned to the paging receiver, power would automatically be extended by the decoder to enable the reception of the following message code word.

When the decoder determines the first code word is not an address code word assigned to the paging receiver, the battery saver strobe 308 continues to maintain the supply of power to the receiver during time interval 332, allowing the receiver to receive the first bit of the second code word of the frame. Again, because the received signal 324 was below the RSSI threshold at the time of reception of bit B0, the adaptive battery saver controller cannot positively identify the code word as being, in this instance, a received message code word. Similarly, the supply of power to the receiver is maintained during time interval 336 to enable the decoder to process the received code word.

In summary, the adaptive battery saving controller of the present invention is capable of monitoring the received signal strength, and when the magnitude of the received signal strength is equal to or greater than a predetermined threshold during the reception of the code word identification bit, the supply of power is suspended to the receiver during the message segment of message code words not intended for the paging receiver. When the magnitude of the received signal strength is less than the predetermined threshold during the reception of the code word identification bit, the supply of power to the receiver, is governed by the decoder to process the received code word in a conventional manner.

Figure 3C:
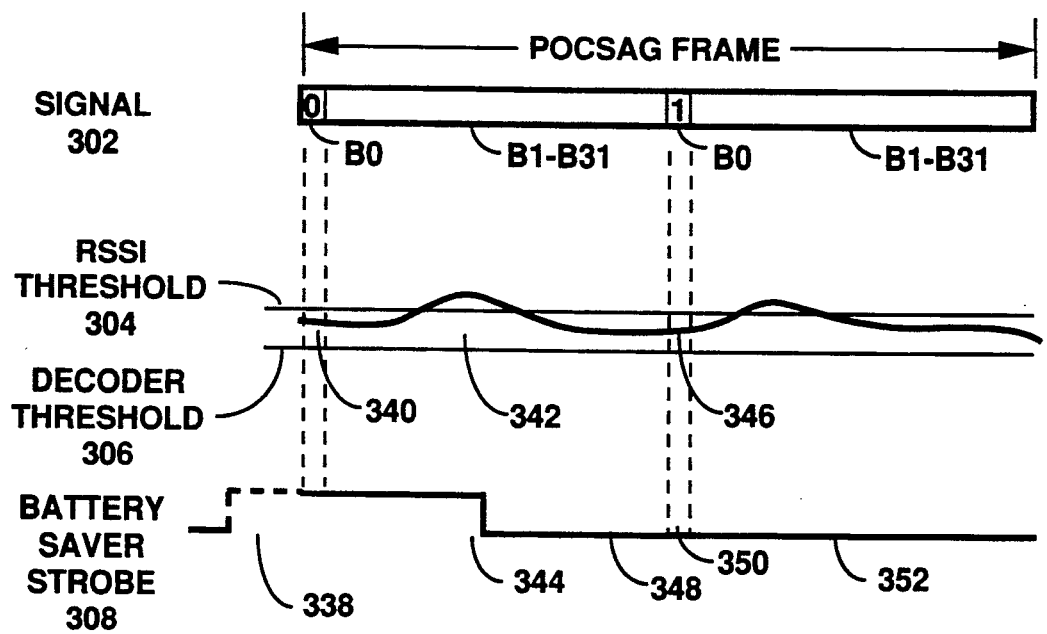
FIG. 3C is a timing diagram showing the battery saving controller operating waveforms for a second embodiment of the adaptive battery saving controller of the present invention.

FIG. 3C is a timing diagram showing the battery saving controller operating waveforms for a second embodiment of the adaptive battery saving controller of the present invention. In the second embodiment of the present invention, the adaptive battery saving controller is capable of detecting hard bit errors which are then used by the battery saving controller to make decisions to perform the battery saving function. A hard bit error constitutes any incorrect address bit which is received when the magnitude of the received signal exceeds the RSSI threshold. Because of the structure of the POCSAG code word, no single bit error can result in the generation of a different valid address code word. Consequently, when a hard bit error is detected, the battery saving controller can be assured the code word being received is not assigned to the paging receiver. As shown in FIG. 3C, prior to bit B0 being received, the battery saver strobe 308 indicates power is being supplied to the receiver during time interval 338, allowing the receiver to warm up prior to the reception of the first bit of the first code word of the frame. Because the magnitude of the received signal 340 is below the RSSI threshold 304 during the reception of the first data bit at time 340, the adaptive battery saving controller continues to supply power to the receiver on a bit by bit basis while the address being received is being decoded. During time interval 344, the address bit received did not match the corresponding address bit for the predetermined address assigned to the paging receiver. Since the magnitude of the received signal 342 exceeded the RSSI threshold, the adaptive battery saving controller of the present invention determines the error detected is a hard error, and the supply of power is suspended to the receiver prior to the completion of address decoding during time interval 348, as shown. Because the address code word detected during time interval 344 is determined as not being intended for the paging receiver, the battery saving controller will additionally suspend the supply of power to the receiver during the corresponding message code word during time intervals 350 and 352.

In summary, the adaptive battery saving controller of the present invention described above makes battery saving decisions based on detecting hard bit errors. By being capable of making battery saving decisions based on hard bit errors, additional energy is conserved as compared to the prior art battery saving controllers.

Note that in alternate embodiments, thresholds 304 and 306 could have various other relationships including being equal to each other.

Figure 4:
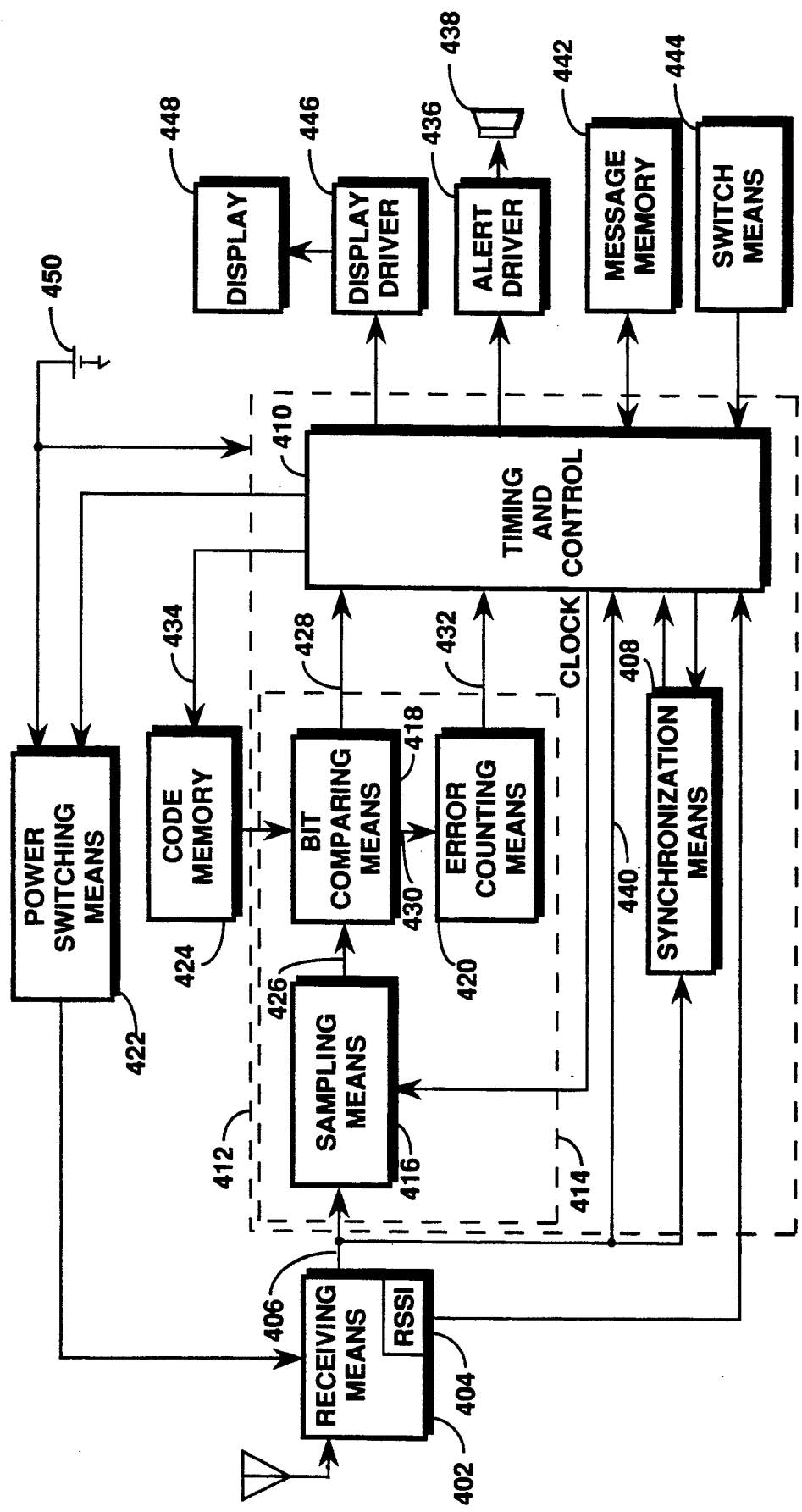
FIG. 4 is an electrical block diagram of a communication receiver utilizing the first and second preferred embodiments of the adaptive battery saving controller of the present invention.

FIG. 4 is an electrical block diagram of a communication receiver, such as a paging receiver, utilizing the first and second preferred embodiments of the adaptive battery saving controller of the present invention. In the preferred embodiments of the present invention, coded message signals are transmitted in the POCSAG signaling format, although it will be appreciated the present invention would function as described with other signaling formats as well. In the POCSAG signaling format, the coded message signals transmitted include address code words and message code words corresponding thereto, as in the case for numeric or alphanumeric message transmissions. The address code words include an address identification bit and an address segment, and the message code words include a message identification bit and a message segment, as previously described. The transmitted coded message signals are intercepted by the paging receiver's antenna, and are then coupled into the input of a receiver, or receiving means 402. In the preferred embodiment of the present invention, receiving means 402 is a conventional frequency modulated (FM) receiver, which is well known in the art. Coupled to the receiving means 402, is a received signal strength indicator (RSSI) circuit 404, which functions as a signal quality detecting means. Several types of RSSI devices are known in the art including these measuring an 'IF rise' of an FM receiver, or those measuring the audio spectrum of the detected FM signal. The RSSI circuit generates a quality indication signal indicating the received signal quality when the received signal strength is equal to or greater than a predetermined signal magnitude, such as corresponding to a predetermined carrier to noise ratio value, such as a value of +6 dB. It will be appreciated, other carrier to noise ratio values may be utilized, however as the carrier to noise ratio value approaches the decoder threshold, the likelihood of detecting soft errors, such as generated by burst noise, or signal fading, becomes more prevalent. It will also be appreciated, setting the predetermined signal magnitude to higher values will only minimally reduce the bit error rate while significantly reducing the geographic area within which the adaptive battery saving controller of the present invention will operate, thereby reducing the energy consumption savings that may be obtained in operation.

The output 406 of the receiving means is a stream of binary information, corresponding to the received address and message information. The output 406 of the receiving means, couples to the input of the synchronization means 408 which synchronizes the decoder and battery saving controller operation to the transmitted coded message signals. Operation of the synchronization means is described in U.S. Pat. No. 4,995,099 issued Feb. 19, 1991 to Davis, entitled "Power Conservation Method and Apparatus for a Portion of a Predetermined signal" which is assigned to the assignee of the present invention. The synchronization means 408 generates a recovered bit clock which couples to timing and control circuit 410. The timing and control circuit 410 generates timing signals for address decoding, as well as generates timing signals controlling the battery saver operation, as will be described below.

The output 406 of the receiving means also couples to the input of an address decoder 412 comprising a address correlator 414 and the timing and control circuit 410. The address correlator 414 includes a sampling means 416, a bit comparing means 418, and an error counting means 420. Sampling means 416 samples the received data bits from the receiving means output 406, and temporarily stores the address code word data bits as they are received for further processing. The output 426 of the sampling means couples to the input of the bit comparing means 418 which compares the most recently received data bit with the corresponding address bit information stored in code memory 424. An output 434 from the timing and control circuit 410 generates timing signals which are coupled to the input of the code memory 424, enabling the code memory contents to be read out in synchronism with the received address code word data bits. A first output 428 of bit comparing means 418 couples to the timing and control circuit 410 to provide information on the value of the first data bit of the received code word. This information indicates whether the received code word is an address code word or a data code word. A second output 430 of the bit comparing means 418 couples to the input of error counting means 420 to provide an indication of whether each data bit, as received, correlates with the corresponding address bit information stored in code memory 424. When the output 430 of the bit comparing means 418 indicates the received address code word data bit does not correlate with the corresponding address information bit, the error counter count is incremented by one. The output 432 or the error counting means 420 also couples to the timing and control circuit 410 which processes the error count information as will be described in detail below. In the preferred embodiment of the present invention, the address decoder 412 is implemented using a microcomputer, such as an MC68HC05 such as manufactured by Motorola.

When the received address code word correlates to the stored address information, as indicated by the error count value being below a predetermined error count value (three in the preferred embodiment), indicating an address has been detected, the timing and control circuit 410 generates an alert signal, in the case of a tone only page, which is coupled to the input of the alert driver circuit 436. The output of the alert driver circuit 436 couples the alert signal to a transducer 438 to provide an audible alert alerting the user of the receipt of the message. When the message being received is a numeric or an alphanumeric message, the received message information following the address code word is coupled to the input 440 of the timing and control circuit 410, which then stores the received message information into message memory 442. The timing and control circuit 410 then generates the alert signal which is coupled to the alert driver circuit 436. The output of the alert driver circuit 436 then couples the alert signal to a transducer 438 to provide an audible alert alerting the user of the receipt of the message information which is stored in the message memory. Switch means 444, includes user actuatable switches for controlling the operation of the communication receiver. In particular, the message information can be retrieved from the message memory 442 by the user actuating a READ switch, which causes the message information to be read from the message memory 442 by the timing and control circuit 410. The retrieved message information is coupled from the timing and control circuit 410 to the input of the display driver 446 which processes the message information for display by display 448. Display 448 may be implemented using any number of well known display technologies, such as an LCD display for displaying numeric or alphanumeric information.

Power for the communication receiver is supplied by a battery 450. The battery 450 couples to the decoder circuit 412, which includes circuitry (not shown) for stepping up the single cell battery voltage to a level sufficient to operate the decoder electronics. The battery output also couples to an input of the power switching means 422 which enables the supply of power to be switched to the receiving means 402. A second input to the power switching means 422 is coupled to the timing and control circuit 410 which controls the supply of power to the receiving means 406 by the power switching means 422. An output from the received signal strength indicating circuit 404 couples to the timing and control circuit 410, enabling the operation of the adaptive battery saving controller of the present invention, to be described in further detail below.

Figure 5:
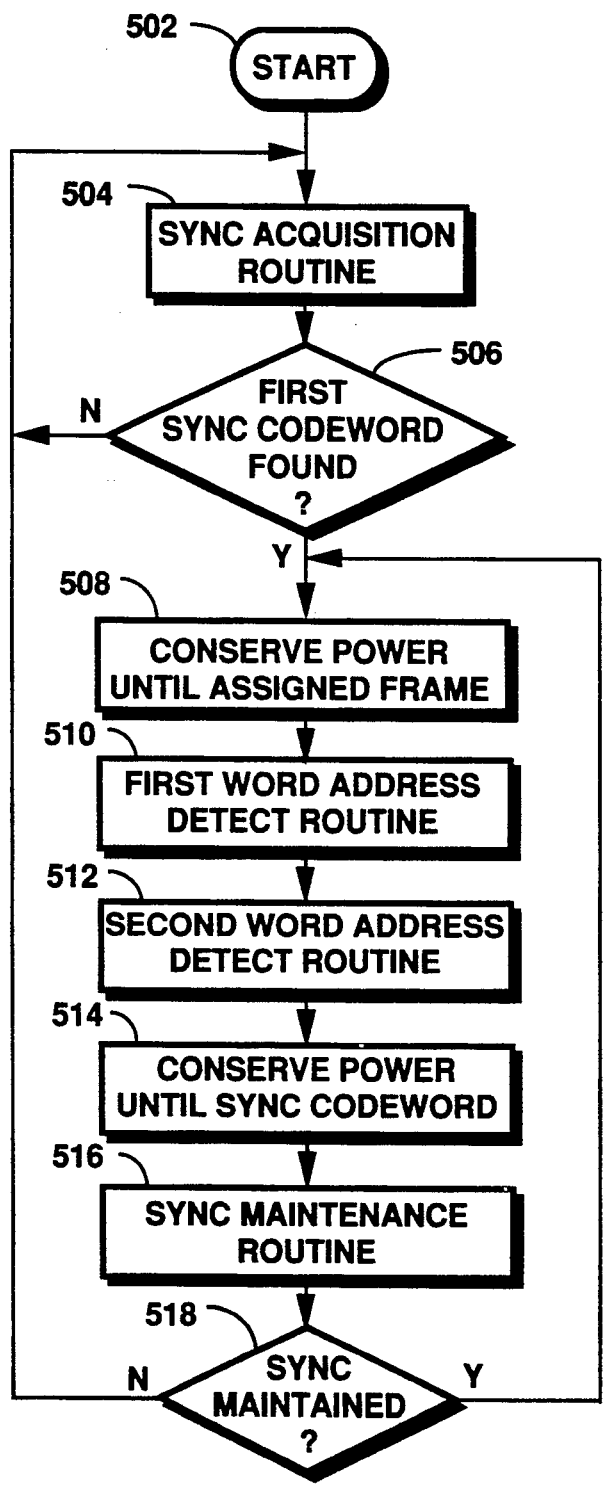
FIG. 5 is a flow chart showing the general battery saving operation of the adaptive battery saving controller of the present invention.

FIG. 5 is a flow chart showing the general battery saving operation of the adaptive battery saving controller of the present invention. Microcomputer decoder 412 executes many other well known programs for controlling the operation of the receiver as well, and which will not be described herein. Only those functions necessary for the description of the present invention are detailed herein. The program starts at step 502 which is typically a power on sequence. The program proceeds to the sync acquisition routine 504, which searches for and synchronizes with the synchronization code word. When the signaling format is that of the POCSAG signaling format, finding the first synchronization code word, at step 506 indicates synchronization to the POCSAG signal. Steps 504 and 506 are repeatedly performed until synchronization to the POCSAG signal is achieved. Any of a number of methods may be utilized for implementing the sync acquisition routine, such as described by U.S. Pat. No. 4,961,073 issued Oct. 2, 1990, to Drapac et al., entitled "Battery Saving Apparatus and Method for Providing Optimum Synchronization Code Word Detection", or U.S. Pat. No. 4,995,099 issued Feb. 19, 1991 to Davis, entitled "Power Conservation Method for a Portion of a Predetermined Signal" which are hereby incorporated by reference herein.

Upon synchronization, the programming proceeds to step 508 where the power is conserved until the receiver's assigned frame is expected. The power conservation includes operating the receiving means 402 and/or the decoding means 412, and any other receiving circuitry in the low power mode. Next, in step 510, the receiver is initially operated in the high power mode in order to receive and decode information transmitted within the first code word of the receiver's assigned frame. When the address of the receiver is detected within the first code word of the assigned frame, an alert is generated, as previously described above. When the information received during the first code word is not an address code word, or is not an address assigned to the receiver, the supply of power to the receiver is suspended early during the first code word as will be described in detail below. Next, in step 512, the receiver is again initially operated in the high power mode in order to receive and decode information transmitted within the second code word of the receiver's assigned frame. When the address of the receiver is detected within the second code word of the assigned frame, an alert is generated, as previously described above. When the information received during the second code word is not an address code word, or is not an address assigned to the receiver, the supply of power to the receiver is again suspended early during the second code word as will also be described in detail below. A detailed description of the first word address detection routine 510, and the second word address detection routine 512 are provided in FIGS. 6 and 7, respectively.

Next, in step 514, power is conserved until the next synchronization code word. In step 516, a sync maintenance routine is performed. During sync maintenance, power may also be conserved during a part of the code, as described in U.S. Pat. No. 4,995,099 issued Feb. 19, 1991 to Davis, described above.

After completion of step 516, the program then proceeds to step 518 to determined the result of the sync maintenance routine. If the determination is made that the sync is maintained, the program returns to step 508 thereby continuing the decoding of the received POCSAG signals. If, however, the determination is made that the sync is not maintained, the program returns to step 504 to re-acquire sync.

In summary, FIG. 5 provides a general description of the sync acquisition, address code word decoding, and sync maintenance routines utilizes in conjunction with the adaptive battery saving controller of the present invention.

Figure 6:
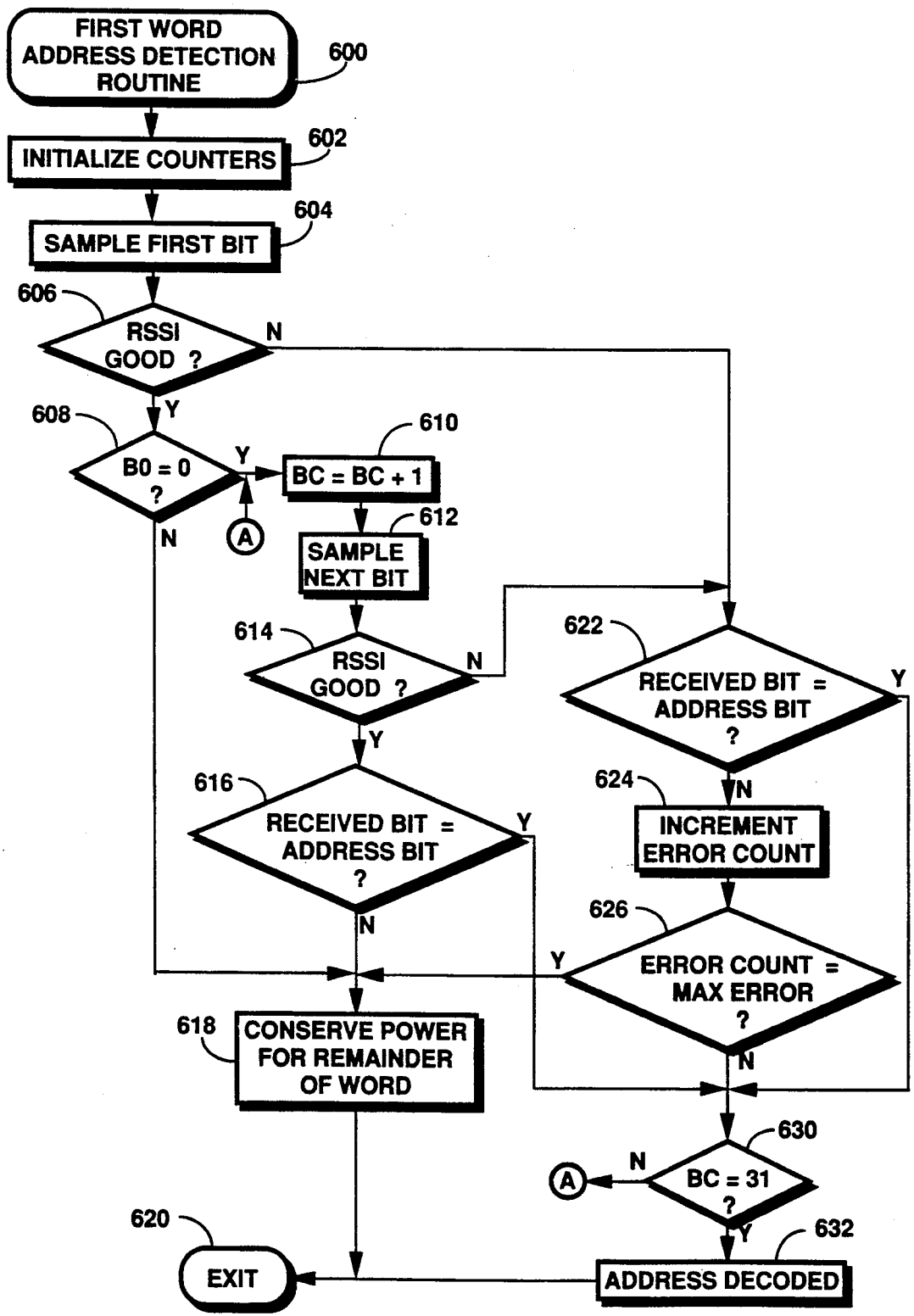
FIG. 6 is a flow chart describing the battery saving operation of the adaptive battery saving controller of the present invention during the detection of the first assigned frame code word.

FIG. 6 is a flow chart describing the battery saving operation of the adaptive battery saving controller of the present invention during the detection of the first assigned frame code word. The microcomputer enters the first word address detection routine 600, at the beginning of the assigned frame, as described above. A number of counters utilized in address decoding are initialized to zero, at step 602, including an error counter and a bit counter, both of which are maintained by the microcomputer. The first bit of the received code word is then sampled, at step 604. The output of the RSSI circuit is checked by the microcomputer at step 606 to determine if the received signal strength is equal to or greater than the predetermined signal magnitude during the time the first bit was received. When the received signal strength is equal to or greater than the predetermined signal magnitude during the reception of the first bit, at step 606, the microcomputer next checks the value of the first received bit. When the value of the first received bit is not a logic zero, at step 608, indicating the code word being received is a message code word, the microcomputer terminates the supply of power to the receiver during the remainder of the first code word, at step 618. The microcomputer then exits the first word address detection routine 600, at step 620.

When the value of the first received bit is a logic zero, at step 608, indicating the code word being received is an address code word, the microcomputer maintains the supply of power to the receiver for reception of the next data bit. The bit counter is incremented, at step 610, after which the next bit of the received code word is sampled, at step 612. The output of the RSSI circuit is next checked by the microcomputer at step 614 to determine if the received signal strength is equal to or greater than the predetermined signal magnitude during the reception of the next data bit. When the received signal strength is good during the reception of the next bit, at step 614, the microcomputer next checks value of the received address bit with the corresponding stored address bit for the address assigned to the receiver, at step 616. When the received address bit does not match the corresponding stored address bit, indicating the detection of a hard decoding error, the microcomputer terminates the supply of power to the receiver during the remainder of the first code word, at step 618. The microcomputer then exits the first word address detection routine 600, at step 620.

When the received signal strength is less than the predetermined signal magnitude during the reception of the first data bit, at step 606, or during the reception of the next data bit, at step 614, the microcomputer correlates the received information using the correlation routine described by steps 622, 624 and 626. The microcomputer first checks the value of the received address bit with the corresponding stored address bit for the address assigned to the receiver, at step 622. When the received address bit does not match the corresponding stored address bit, indicating the detection of a soft decoding error, the microcomputer increments the the error counter, at step 624. The error counter value is next checked to determine if the error count is equal to a maximum predetermined error count, at step 626. When the error count is equal to the maximum predetermined error count, indicating the received code word does not correlate to the stored address code word assigned to the receiver, the microcomputer terminates the supply of power to the receiver during the remainder of the first code word, at step 618. The microcomputer then exits the first word address detection routine 600, at step 620.

When the error count is less than the maximum predetermined error count, at step 626, or the received bit matches the corresponding stored address bit, at step 616, or the received bit matches the corresponding stored address bit, at step 622, the value of the bit counter is checked, at step 630, to determine if the entire first code word has been received. When the bit counter value indicates the entire first code word has been received, the microcomputer determines that the address has been properly decoded, at step 632, where upon the microcomputer then exits the first word address detection routine 600, at step 620. When the bit counter value, at step 630, indicates the entire first code word has not been received, the microcomputer proceeds to step 610, whereupon the bit counter is incremented by one, and the next bit is sampled, at step 612. The decoder continues correlating the received code word bit, as previously described above.

In summary, when the received signal strength magnitude is greater than a predetermined signal magnitude during the reception of the first code word bit, and the received code word bit indicates the code word is a message code word, power to the receiver is conserved during the remainder of the first code word. When the received signal strength magnitude is greater than the predetermined signal magnitude during the reception of any other first code word bit, and the received code word bit does not match the corresponding stored address bit, indicating the detection of a hard decoding error, power to the receiver is also conserved during the remainder of the first code word. When the received signal strength magnitude is less than the predetermined signal magnitude during the reception of any code word bit, conventional address decoding techniques are utilized to correlate the received code word with the stored address code word assigned to the receiver.

Figure 7:
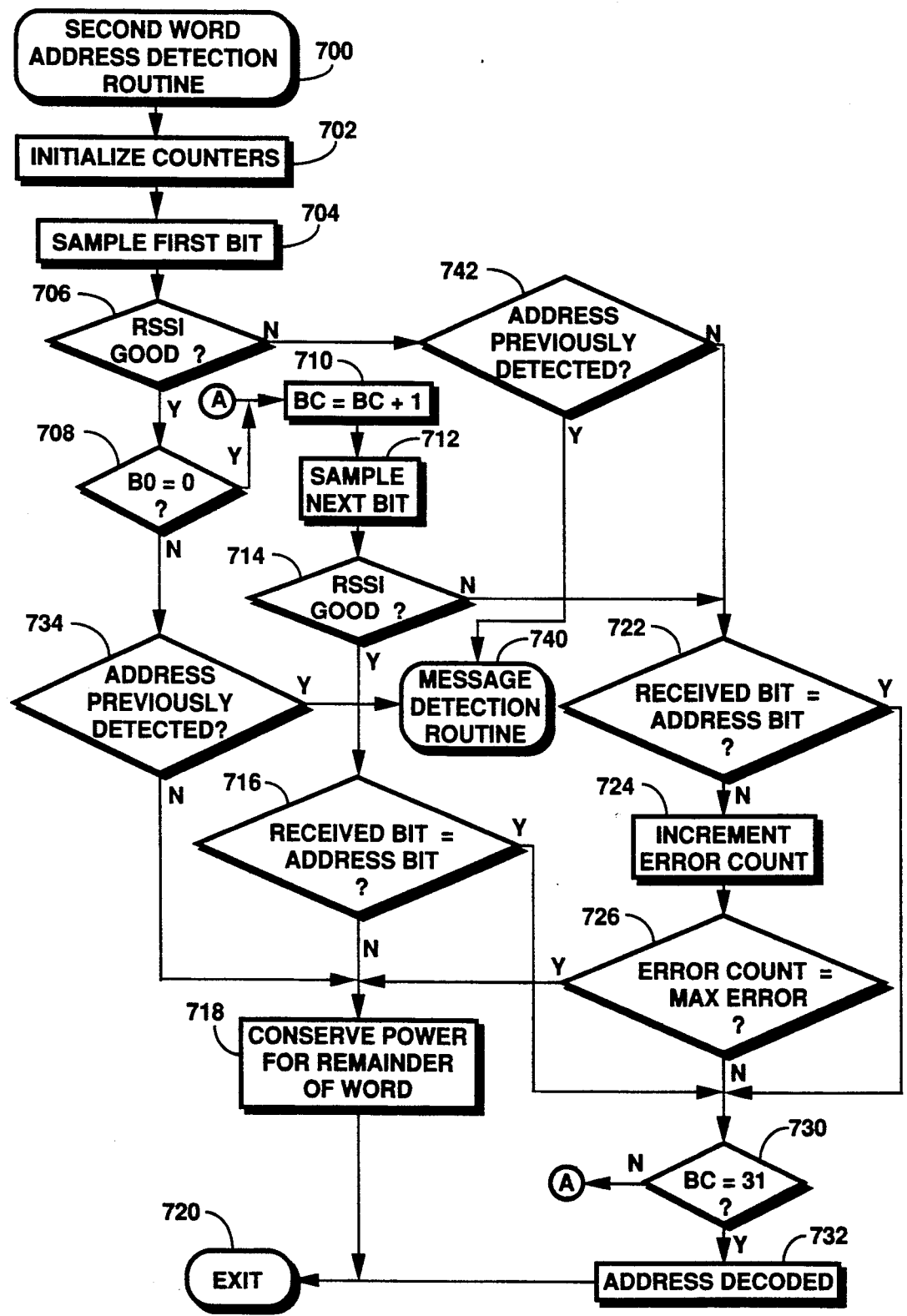
FIG. 7 is a flow chart describing the battery saving operation of the adaptive battery saving controller of the present invention during the detection of the second assigned frame code word.

FIG. 7 is a flow chart describing the battery saving operation of the adaptive battery saving controller of the present invention during the detection of the second assigned frame code word. The microcomputer enters the second word address detection routine 700, at the beginning of the assigned frame, as described above. The counters utilized in address decoding are again initialized to zero, at step 702. The first bit of the received code word is then sampled, at step 704. The output of the RSSI circuit is checked by the microcomputer at step 706 to determine if the received signal strength is equal to or greater than the predetermined signal magnitude during the time the first bit was received. When the received signal strength is equal to or greater than the predetermined signal magnitude during the reception of the first bit, at step 706, the microcomputer checks the value of the first received bit. When the value of the first received bit is not a logic zero, at step 708, indicating the code word being received is a message code word, the microcomputer checks to determine if the address was previously detected during the previous frame, at step 734, indicating the message being received is intended for the receiver. The microcomputer then enters the address detection routine, at step 740. The particulars of the address detection routine are well known in the art. When the microcomputer determines the received message code word is not intended for the receiver, at step 734, the microcomputer terminates the supply of power to the receiver during the remainder of the second code word, at step 718. The microcomputer then exits the second word address detection routine 700, at step 720.

When the value of the first received bit is a logic zero, at step 708, indicating the code word being received is an address code word, the microcomputer maintains the supply of power to the receiver for reception of the next data bit. The bit counter is incremented, at step 710, after which the next bit of the received code word is sampled, at step 712. The output of the RSSI circuit is next checked by the microcomputer at step 714 to determine if the received signal strength is equal to or greater than the predetermined signal magnitude during the reception of the next data bit. When the received signal strength is good during the reception of the next bit, at step 714, the microcomputer next checks value of the received address bit with the corresponding stored address bit for the address assigned to the receiver, at step 616. When the received address bit does not match the corresponding stored address bit, indicating the detection of a hard decoding error, the microcomputer terminates the supply of power to the receiver during the remainder of the second code word, at step 718. The microcomputer then exits the second word address detection routine 700, at step 720.

When the received signal strength is less than the predetermined signal magnitude during the reception of the first data bit, at step 706, the microcomputer determines if the assigned address was previously detected during the first word address detection routine, at step 742. When the address was previously detected, the microcomputer enters the address detection routine at step 740. When the microcomputer determines the address was not previously detected during the first word address detection routine, at step 742, or that the received signal strength is less than the predetermined signal magnitude during the reception of the first data bit, at step 714, the microcomputer correlates the received information using the correlation routine described by steps 722, 724 and 726. The microcomputer first checks the value of the received address bit with the corresponding stored address bit for the address assigned to the receiver, at step 722. When the received address bit does not match the corresponding stored address bit, indicating the detection of a soft decoding error, the microcomputer increments the error counter, at step 724. The error counter value is next checked to determine if the error count is equal to a maximum predetermined error count, at step 726. When the error count is equal to the maximum predetermined error count, indicating the received code word does not correlate to the stored address code word assigned to the receiver, the microcomputer terminates the supply of power to the receiver during the remainder of the first code word, at step 718. The microcomputer then exits the first word address detection routine 700, at step 720.

When the error count is less than the maximum predetermined error count, at step 726, or the received bit matches the corresponding stored address bit, at step 716, or the received bit matches the corresponding stored address bit, at step 722, the value of the bit counter is checked, at step 730, to determine if the entire first code word has been received. When the entire first code word has been received, the microcomputer determines that the address has been properly decoded, at step 732, where upon the microcomputer then exits the first word address detection routine 700, at step 720. When the bit counter value, at step 730, indicates the entire first code word has not been received, the microcomputer proceeds to step 710, whereupon the bit counter is incremented by one, and the next bit is sampled, at step 712. The decoder continues correlating the received code word bit, as previously described above.

In summary, the second word address detection routine processes the received code word information, generally as described for the first word, above. When a message code word is detected during the second word address detection routine, and the address was previously detected during the first word address detection routine, the message being received which is intended for the receiver is processed in a normal manner.

An adaptive battery saving controller has been described above which utilizes a received signal strength indicator together with an address decoder to enable the early termination of the supply of power to the receiver following either the detection of a message code word which is not intended for the receiver, or following the detection of a hard address decoding error. When the received signal strength falls below a predetermined signal magnitude, address decoding, and battery saving operation revert to well known decoding and battery saving methods.

While specific embodiments of this invention have been shown and described, further modifications and improvements will occur to those skilled in the art. All modifications which retain the basic underlying principles disclosed and claimed herein are with the scope and spirit of the present invention.

We claim:

1. A communication receiver capable of receiving a carrier signal having a binary coded message signal modulated thereon and including address code words and message code words corresponding thereto, said communication receiver comprising:

means for receiving and demodulating the transmitted coded message signal;

signal quality detecting means, coupled to said receiving means, for generating a quality indication signal indicating an acceptable carrier signal quality level when the magnitude of the received coded message signal is equal to or greater than a predetermined signal magnitude;

decoding means, coupled to said receiving means, for decoding the received address code words to identify the corresponding message code words intended therefore;

said decoding means further including distinguishing means for distinguishing address code words and message code words; and battery saving means, responsive to said decoding means and the quality indication signal, for suspending the supply of power to said receiving means following substantially upon the detection by said distinguishing means of received message code words not intended for the communication receiver.

2. The communication receiver according to claim 1, wherein said battery saving means is further responsive to said decoding means for maintaining the supply of power to said receiving means upon the detection by said distinguishing means of received message code words intended for the communication receiver.

3. The communication receiver according to claim 1, wherein the address and message code words include an identification bit for identifying the code word type, and wherein said distinguishing means comprises bit comparing means, for comparing the received code word identification bit to predetermined address and message identification bits, for distinguishing the address code word from the message code word.

4. The communication receiver according to claim 1, wherein said battery saving means is further responsive to said decoding means and the absence of a quality indication signal, for maintaining the supply of power to said receiving means following substantially upon the detection by said distinguishing means of received message code word not intended for the communication receiver.

5. The communication receiver according to claim 1, wherein said signal quality detecting means comprises a received signal strength indicator.

6. The communication receiver according to claim 1, further comprising alerting means, responsive to said decoding means, for generating a sensible alert in response to the received address matching a predetermined address assigned to the communication receiver.

7. The communication receiver according to claim 1, further comprising:

memory means for storing the received message; and
display means, for displaying the stored message.

8. An adaptive battery saving controller for a communication receiver capable of receiving transmitted coded message signals comprising address code words and message code words corresponding thereto, said adaptive battery saving controller comprising:

signal quality detecting means, responsive to the received coded message signals, for generating a quality indication signal indicating an acceptable received signal quality level when the magnitude of the received coded message signal is equal to or greater than a predetermined signal magnitude;

decoding means, for decoding the received address code words to identify the corresponding message code words intended therefore, said decoding means further including distinguishing means for distinguishing address code words and message code words; and battery saving means, responsive to said decoding means and to the quality indication signal, for suspending the supply of power to the communication receiver following substantially upon the detection by said distinguishing means of received message code words not intended for the communication receiver.

9. The adaptive battery saving controller according to claim 8, wherein said battery saving means is further responsive to said decoding means for maintaining the supply of power to said receiving means upon the detection by said distinguishing means of receipt of the message code words intended for the communication receiver.

10. The adaptive battery saving controller according to claim 8, wherein the address and message code words include an identification bit for identifying the code word type, and wherein said distinguishing means comprises bit comparing means, for comparing the received code word identification bit to predetermined address and message identification bits, for distinguishing the address code word from the message code word.

11. The adaptive battery saving controller according to claim 8, wherein said battery saving means is further responsive to said decoding means and the absence of a quality indication signal, for maintaining the supply of power to said receiving means following substantially upon the detection by said distinguishing means of received message code word not intended for the communication receiver.

12. The adaptive battery saving controller according to claim 8, wherein said signal quality detecting means comprises a received signal strength indicator.

13. A communication receiver capable of receiving a carrier signal having a binary coded message signal modulated thereon, the coded message signal comprising at least a binary address code word, said communication receiver comprising:

means for receiving and demodulating the transmitted coded message signal;

signal quality detecting means, coupled to said receiving means, for generating a quality indication signal indicating an acceptable carrier signal quality level when the magnitude of the received coded message signal is equal to or greater than a predetermined signal magnitude;

code memory means, for storing a predetermined binary address code word assigned to the communication receiver;

decoding means, coupled to said receiving means, for decoding the received address code word, said decoding means comprising bit error detecting means, coupled to said receiving means and to said code memory means, for generating a bit error signal when a data bit of the received address code word does not match a corresponding data bit of the predetermined address code word, and controller means, responsive to the bit error signal and the quality indication signal for generating a first control signal in response thereto; and battery saving means, responsive to the first control signal for suspending the supply of power to said receiver means following substantially upon the occurrence of the bit error signal.

14. The communication receiver according to claim 13, wherein said controller means is further responsive to the bit error signal and the absence of a quality indication signal for generating a second control signal in response thereto, and said battery saving means is further responsive to the second control signal, for maintaining the supply of power to said receiving means following substantially upon the occurrence of the bit error signal.

15. The communication receiver according to claim 14, wherein said decoding means further comprises:

error counting means, responsive to the absence of the quality indication signal and the bit error signal, for generating an error count signal representing the number of errors detected.

16. The portable communication receiver according to claim 15, wherein said controller means is further responsive to the error count signal for generating the first control signal, and said battery saving means is further responsive to the first control signal for suspending the supply of power to said receiver means when the error count detected is greater than or equal to a predetermined error count.

17. An adaptive battery saving controller for a communication receiver capable of receiving a transmitted coded message signal comprising at least an address code words, said adaptive battery saving controller comprising:

signal quality detecting means, responsive to the received coded message signal, for generating a quality indication signal indicating an acceptable received signal quality level when the magnitude of the received coded message signal is equal to or greater than a predetermined signal magnitude;

code memory means, for storing a predetermined address code word assigned to the communication receiver;

decoding means, for decoding the received address code word, said decoding means comprising bit error detecting means, coupled to said said code memory means, for generating a bit error signal when a data bit of the received address code word does not match a corresponding data bit of the predetermined address code word, and controller means, responsive to the bit error signal and the quality indication signal for generating a first control signal in response thereto; and battery saving means, responsive to the first control signal, for suspending the supply of power to said receiver means following substantially upon the occurrence of the bit error signal.

18. The adaptive battery saving controller according to claim 17, wherein controller means is further responsive to the bit error signal and the absence of a quality indication signal for generating a second control signal in response thereto, and said said battery saving means is further responsive to the second control signal, for maintaining the supply of power to said receiving means following substantially upon the occurrence of the bit error signal.

19. The adaptive battery saving controller according to claim 17, wherein said decoding means further comprises:

error counting means, responsive to the bit error signal, for generating an error count signal representing the number of errors detected.

20. The adaptive battery saving controller according to claim 19, wherein said controller means is further responsive to the error count signal for generating the first control signal, and said battery saving means is further responsive to the first control signal for suspending the supply of power to said receiver means when the error count detected is greater than or equal to a predetermined error count.

* * * * *